United States Patent
Kervadec et al.

(10) Patent No.: US 11,997,369 B2
(45) Date of Patent: *May 28, 2024

(54) METHOD OF PROCESSING AN ERROR DURING THE RENDERING OF A DIGITAL CONTENT

(71) Applicant: ORANGE, Issy-les-Moulineaux (FR)

(72) Inventors: Sylvain Kervadec, Sens de Bretagne (FR); Pierre Ruellou, Domloup (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,785

(22) Filed: Apr. 21, 2023

(65) Prior Publication Data

US 2023/0269445 A1 Aug. 24, 2023

Related U.S. Application Data

(63) Continuation of application No. 15/110,383, filed as application No. PCT/FR2015/050009 on Jan. 5, 2015, now Pat. No. 11,671,681.

(51) Int. Cl.
*H04N 21/482* (2011.01)
*H04L 1/00* (2006.01)
(Continued)

(52) U.S. Cl.
CPC ......... *H04N 21/845* (2013.01); *H04L 1/0006* (2013.01); *H04L 1/0014* (2013.01);
(Continued)

(58) Field of Classification Search
CPC ......... H04N 21/26258; H04N 21/4825; H04N 21/845; H04N 21/2358
See application file for complete search history.

(56) References Cited

U.S. PATENT DOCUMENTS 8,683,542 B1 3/2014 Henry
8,909,736 B1 12/2014 Bosch et al.
(Continued)

FOREIGN PATENT DOCUMENTS

WO 2013004260 A1 1/2013

OTHER PUBLICATIONS

International Search Report and Written Opinion dated Apr. 21, 2015 for corresponding International Application No. PCT/FR2015/050009, filed Jan. 5, 2015.
(Continued)

*Primary Examiner* — Frank Johnson
(74) *Attorney, Agent, or Firm* — David D. Brush; Westman, Champlin & Koehler, P.A.

(57) ABSTRACT

A method is provided for processing an error during restitution of digital content during a multimedia session on a terminal. The session offers a plurality of representations of the digital content which are described in a medium carrying information describing the multimedia session and transmitted independently of the representation data. The method includes, following the obtaining of the description-carrying medium, acts of obtaining, for at least one representation indicated in the description information-carrying medium, at least one item of information regarding guarantee of availability of the data of the representation on a server; of comparing the information regarding guarantee of availability of the data of the representation on the server with at least one predetermined value; of selecting a fallback representation as a function of the result of the comparison, and upon detecting a restitution error, of toggling to the fallback representation selected.

8 Claims, 3 Drawing Sheets

(51) Int. Cl.
*H04L 65/612* (2022.01)
*H04L 65/75* (2022.01)
*H04L 65/80* (2022.01)
*H04N 21/2343* (2011.01)
*H04N 21/262* (2011.01)
*H04N 21/2662* (2011.01)
*H04N 21/433* (2011.01)
*H04N 21/44* (2011.01)
*H04N 21/442* (2011.01)
*H04N 21/845* (2011.01)

(52) U.S. Cl.
CPC ............ *H04L 65/612* (2022.05); *H04L 65/75* (2022.05); *H04L 65/80* (2013.01); *H04N 21/23439* (2013.01); *H04N 21/2662* (2013.01); *H04N 21/4331* (2013.01); *H04N 21/44008* (2013.01); *H04N 21/4424* (2013.01)

(56) References Cited

U.S. PATENT DOCUMENTS

| | | | |
|---|---|---|---|
| 9,338,209 | B1 | 5/2016 | Begen et al. |
| 9,432,961 | B2 | 8/2016 | Rao et al. |
| 10,939,178 | B2 | 3/2021 | Long et al. |
| 2010/0188936 | A1 | 7/2010 | Beppu et al. |
| 2011/0138020 | A1* | 6/2011 | Pantos ................ H04L 65/70 709/219 |
| 2011/0246563 | A1 | 10/2011 | Keum et al. |
| 2012/0179833 | A1 | 7/2012 | Kenrick et al. |
| 2013/0007223 | A1 | 1/2013 | Luby et al. |
| 2013/0182705 | A1 | 7/2013 | Avni et al. |
| 2013/0325609 | A1 | 12/2013 | Sokolov et al. |
| 2014/0130099 | A1 | 5/2014 | Hunisetty |
| 2014/0150044 | A1 | 5/2014 | Takahashi et al. |
| 2014/0230003 | A1 | 8/2014 | Ma et al. |
| 2014/0281002 | A1* | 9/2014 | Sun ................ H04N 21/64322 709/231 |
| 2014/0282772 | A1 | 9/2014 | Chen et al. |
| 2014/0337909 | A1* | 11/2014 | Phillips ................ H04N 21/812 725/115 |
| 2014/0365613 | A1* | 12/2014 | Phillips ................ H04L 65/612 709/219 |
| 2015/0074732 | A1 | 3/2015 | Green et al. |
| 2015/0296269 | A1 | 10/2015 | Tokumo et al. |
| 2015/0365450 | A1 | 12/2015 | Gaunt et al. |
| 2015/0372927 | A1 | 12/2015 | Lv |
| 2015/0381680 | A1 | 12/2015 | Thornburgh et al. |
| 2016/0149978 | A1 | 5/2016 | Wissingh et al. |
| 2016/0373790 | A1 | 12/2016 | Tsukagoshi |
| 2020/0359062 | A1 | 11/2020 | Pantos et al. |

OTHER PUBLICATIONS

Intel, "Another Potential Solution for Server and Network Assisted DASH", 3GPP Draft; S4-130952 DASH SAND Solution, 3rd Generation Partnership Project (3GPP), Mobile Competence Centre; 650, Route Des Lucioles; F-06921 Sophia-Antipolis Cedex; France, vol. SA WG4, No. Vancouver Canada; Sep. 23, 2013-Sep. 27, 2013 Sep. 18, 2013, XP 050727640.

Telefon AB LM Ericcson et al., "IMS Based Adaptive HTTP Streaming", 3GPP Draft; S4-100783 IMS HTTP Streaming, 3rd Generation Partnership Project (3GPP) Mobile Competence Centre; 650 Route des Lucioles; F-06921 Sophia-Antipolis Cedex; France, vol. SA WG4, No. Barcelona, Spain; Nov. 8, 2010, Nov. 2, 2010, XP050527312.

English translation of the International Written Opinion dated Apr. 21, 2015 for corresponding International Application No. PCT/FR2015/050009, filed Jan. 5, 2015.

French Search Report and Written Opinion dated Aug. 8, 2014 for corresponding French Application No. 1450083, filed Jan. 7, 2014.

U.S. Patent Office issued prosecution for U.S. Appl. No. 15/110,383, filed Jul. 7, 2016.

\* cited by examiner

METHOD OF PROCESSING AN ERROR DURING THE RENDERING OF A DIGITAL CONTENT

CROSS-REFERENCE TO RELATED APPLICATIONS

This Application is continuation of U.S. application Ser. No. 15/110,383, filed Jul. 7, 2016, which is a Section 371 National Stage Application of International Application No. PCT/FR2015/050009, filed Jan. 5, 2015, and published as WO 2015/104490 A1 on Jul. 16, 2015, not in English, the contents of which are incorporated herein by reference in their entireties.

FIELD OF DISCLOSURE

The invention belongs to the field of digital content distribution and relates in particular to a method for selecting a representation of a digital content from a plurality of representations available for this same content when there is a rendering error.

BACKGROUND OF DISCLOSURE

With the democratization of high bitrate Internet access, users are increasingly using continuous broadcasting technologies referred to as "streaming", which may be used to consult content without prior downloading. It may also be noted that users today have multiple terminals available from which this content may be consulted. It is, for example, possible to access a video from a personal computer, a connected television or even from a smartphone or tablet mobile terminal. These terminals have heterogeneous capabilities, notably in terms of display, connectivity and processing capacity. In order to make it possible to consult the same content in streaming from heterogeneous terminals, adaptive streaming technologies have been developed, such as the HTTP Live Streaming (HLS) solution developed by Apple® or also the MPEG-DASH (Dynamic Adaptive Streaming over HTTP) standard as described in the standard ISO/IEC 23009-1:2012.

In particular, the MPEG-DASH standard provides for splitting the contents to be broadcast into segments of short duration. Each segment is made available at different bitrates so that for each of them, the terminal may render the version most suited to its capabilities. For example, a connected television with a high bitrate Internet access may render a high quality representation of a digital content whereas a mobile terminal will select a low bitrate representation of the same content. MPEG-DASH also enables terminals to adapt dynamically and transparently to changing network conditions.

The addresses and characteristics of the various representations of the same content are published in a descriptive information medium such as a manifest file. In the case of MPEG-DASH, this file is called an MPD (Media Presentation Description). This file is intended for terminals and describes information on the segments available, such as the addresses of the segments, the video resolution or also the encoding bitrate of the various segments.

It may happen under certain conditions that a particular representation of a content announced in a manifest is no longer available at a given time. For example, an operator of a streaming server may decide to suspend the broadcasting of a high bitrate representation of a digital content when it finds that the server's load reaches a critical threshold. The sudden disappearance of a representation most of the time causes a playback error on terminals on which the suspended representation was in the process of rendering. This unexpected termination of playback is detrimental to the user experience. Indeed, on receiving such an error, a rendering system according to the prior art may, for example:

Stop the rendering and report an error to the user,
Retransmit the request at an increasing interval while waiting for a response,
Suggest that the user selects another representation,
Automatically select a representation of lesser quality.

These behaviors generally induce a break in rendering leading to the abandonment of the consultation by the user when they occur too frequently. So techniques have been developed for informing a terminal of the suspension of broadcasting a particular representation.

A first technique, implemented on the terminal, consists in regularly downloading an update of the manifest file so as to have an up-to-date description of the various representations of a content. The HLS solution from Apple®, for example, performs an update of the manifest file each time a segment is downloaded. This technique, however, has the drawback of generating additional traffic for processing an exceptional problem.

Another technique, implemented on the streaming server, consists in inserting information into the stream itself. In particular it is possible to indicate that the manifest file has expired, so that the terminal may download a modified version of it. This technique also makes it possible to indicate to a terminal that a particular representation of a content is no longer available. However, this technique has drawbacks: first, it requires a particular formatting of the streams to be broadcast for inserting the information therein, and secondly the information may only be known to the terminal when it decodes the corresponding stream. When the broadcast of a particular representation is suspended, a terminal can no longer receive the information inserted in the corresponding stream.

There is therefore a need for a simple solution that minimizes the impact on the user experience in case of unavailability of a representation of a content in the process of rendering.

SUMMARY

A first aspect of the invention relates to a method for processing an error in the course of the rendering of a digital content during a multimedia session on a terminal, said session offering a plurality of representations of said digital content described in a descriptive information medium for the multimedia session transmitted independently of the representation data, the method being such that after obtaining the descriptive medium, it comprises steps of obtaining, for at least one representation indicated in the descriptive information medium, at least one item of information regarding guarantee of availability of the data of the representation on a server; of comparing the information regarding guarantee of availability of the data of the representation on the server with at least one predetermined value; of selecting a fallback representation according to the result of the comparison, and on detection of a rendering error, of switching to the selected fallback representation.

The method thus provides for extracting from a descriptive information medium, such as a manifest file, an item of information regarding guarantee of availability associated with a particular representation of the content. Unlike the prior art, when a rendering error occurs following the sudden unavailability of a particular representation in the process of rendering, the terminal may select a representation the availability of which is guaranteed and continue the rendering of the content from this representation without risking a further interruption that could eventually cause an abandonment of the playback by a weary user. The method thus advantageously makes it possible to avoid a degradation of the user experience related to the termination of the rendering or to the selection of an alternative representation which is also not available.

According to another embodiment, the method is such that the fallback representation is selected prior to the error detection.

The terminal may thus switch very quickly to a representation the availability of which is guaranteed when a rendering error occurs.

According to a particular embodiment, the method is such that the fallback representation is selected at the time of the error.

In this way, if an up-to-date version of the manifest has been downloaded by the terminal between the start of rendering and the occurrence of the error, the selection of a fallback representation may be performed on the basis of this new manifest.

According to another embodiment, the method is such that the information regarding guarantee of availability includes an item of information representative of a type of guarantee belonging to the group including at least a guarantee of availability of the representation; a guarantee of speed of access to the representation; and a guarantee of availability from any access points, as well as an item of information of value associated with the type of guarantee.

The availability of a particular representation may thus relate to its availability over time and guarantee, for example, that the broadcast of the representation will not be suspended. In this way, following a rendering error, the terminal may continue the playback of a content by selecting a representation the broadcast of which will not be suspended.

The information regarding guarantee of availability may also correspond to a guarantee of reduced latency when accessing the content. In this way, a terminal may select an immediately available stream with the aim of improving the user experience when selecting an alternative representation. This guarantee of reduced latency may, for example, correspond to placing the corresponding representation in a network cache.

Availability may further correspond to an availability related to the network accessing the representation. For example, when some representations are only available in some parts of the network, the information regarding availability may enable the terminal to select a representation available locally and avoid the selection of a representation only available on some other PoPs (Points of Presence).

According to another particular embodiment, the method is such that the information regarding guarantee of availability further includes an item of data representative of a temporal period of validity associated with the type of guarantee.

The descriptive information medium may include an item of temporal information, such as a duration, associated with the information regarding availability. A terminal may thus know the duration during which the availability of a particular representation is guaranteed. This information is particularly useful when a content is composed of different sequences, since these sequences may not be available in all the representations. For example, an advertising spot may only be available in low quality whereas the content in which it is inserted may be available in high quality. The method according to the invention enables the terminal to select, for a predetermined period, a representation compatible with the advertising spot the availability of which is guaranteed.

According to another embodiment, the method is such that the step of selecting the fallback representation is repeated at the expiration of the period of validity associated with the information regarding guarantee of availability of the selected fallback representation.

When the availability of the representation in the process of rendering is no longer guaranteed, the terminal may thus select a new representation with a guarantee of availability associated with a future or unexpired period of validity.

The invention also relates to a carrier signal of descriptive information of a plurality of representations of the same digital content during a multimedia session, transmitted independently of the representation data to a terminal and characterized in that it includes an item of information regarding guarantee of availability associated with at least one representation of the digital content, said terminal being arranged for selecting, in case of rendering error, a fallback representation according to said received information regarding guarantee of availability.

According to another embodiment, the carrier signal of descriptive information is such that it further comprises an item of data representative of a temporal period associated with the guarantee of availability of at least one representation of the digital content.

The invention also relates to a device for processing an error in the course of the rendering of a digital content during a multimedia session, said session offering a plurality of representations of said digital content described in a descriptive information medium for the multimedia session transmitted independently of the representation data, the device being such that it comprises units for obtaining (306), for at least one representation indicated in the descriptive information, from the descriptive information, at least one item of information regarding availability of the data of the representation on a server; for comparing (305) the information regarding availability of the data of the representation on the server with a predetermined value; for selecting (307) a fallback representation according to the result of the comparison; and on detection of a rendering error, for switching to the selected fallback representation.

According to another aspect, the invention relates to a computer program comprising the instructions for the execution of the error processing method, when the program is executed by a processor.

Another aspect also relates to an information medium readable by a computer on which a computer program is recorded including instructions for the execution of the steps of the error processing method.

The signals, devices, programs and information media present advantages similar to those of the corresponding method described above.

BRIEF DESCRIPTION OF THE DRAWINGS

Other features and advantages of the invention will appear more clearly on reading the following description of a particular embodiment of the invention, given as a simple, illustrative and non-restrictive example, and the accompanying drawings, in which.

DETAILED DESCRIPTION OF THE ILLUSTRATIVE EMBODIMENTS

In the description that follows, "representation" should be understood to mean a version of an encoded content at a particular resolution and/or bitrate. For example, in the case of a system of an MPEG-DASH type of adaptive streaming, the same digital content may be available in multiple resolutions and/or bitrates, each of these versions then corresponding to a representation.

In the rest of this disclosure, "manifest" should be understood to mean a description of the various representations of a digital content stored in a descriptive medium such as a file. The manifest may correspond, for example, to an MPD file according to the MPEG-DASH standard or also a "Playlist" file in the case of the Apple® HLS solution. Generally speaking, the manifest as understood in this document is a file constituting the entry point for a terminal wishing to render a digital content and contains in particular the access addresses to the various segments corresponding to the various representations of a content available to streaming playback as well as characteristics associated with these representations.

The notion of "guarantee of availability" referred to in this document particularly relates to a guarantee of making representation data available by the broadcasting server. As for the distribution of representation data from the broadcasting server to the rendering terminal this may not be guaranteed. It may also be noted that the information regarding guarantee of availability may also be interpreted as a risk of unavailability of a representation, a guarantee of availability of maximum value corresponding to a minimum risk of unavailability and vice versa.

Figure 1:
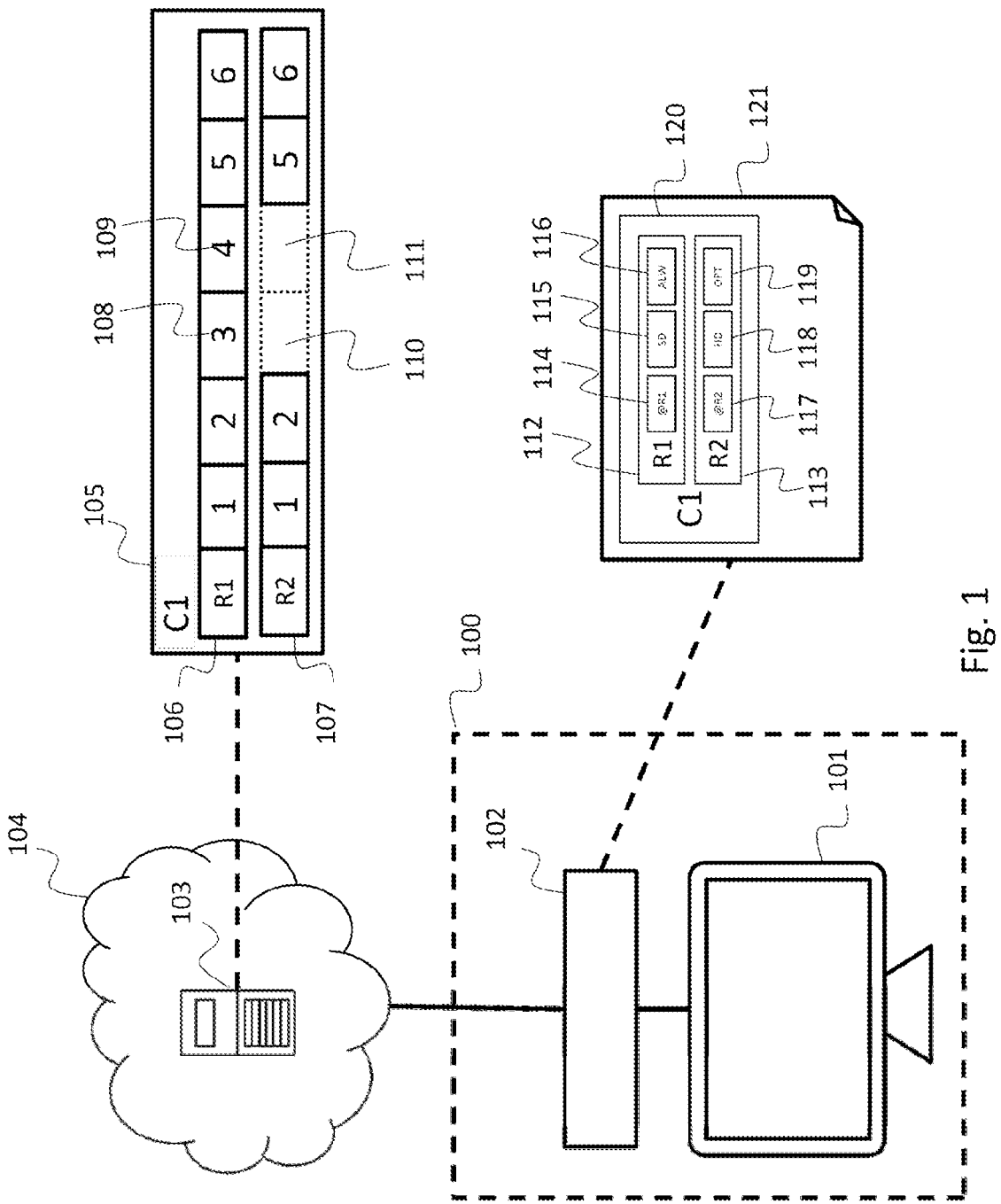
FIG. 1 illustrates an architecture suitable for the implementation of the invention according to one embodiment.

FIG. 1 illustrates an environment suitable for the implementation of the error processing method according to a particular embodiment of the invention. The environment includes a video rendering system 100 consisting, for example, of a television 101 to which a digital decoder 102 is connected. The rendering system is connected to a communication network 104 via a network access, e.g. an ADSL high bitrate Internet access. The communication network 104 may be, for example, a CDN (Content Delivery Network in English) and it will not escape the person skilled in the art that this type of network may include other equipment which is intentionally not represented in FIG. 1 in the interests of clarity of the description. This communication network 104 includes at least one server 103 capable of broadcasting digital contents according to an adaptive streaming protocol. In a non-restrictive way, the server may, for example, broadcast contents on HTTP (Hypertext Transfer Protocol) according to the MPEG-DASH standard, Apple® HLS or also Adobe® Dynamic Streaming. The rendering system 100 is thus capable of receiving, decoding and reproducing digital contents broadcast by the streaming server 103 via the communication network 104.

The server 103 may, for example, host a digital content C1 (105) prepared for an adaptive streaming broadcast. In most of the adaptive streaming standards, the preparation of the content C1 for an adaptive streaming broadcast consists in producing different versions of this content, encoded, for example, with different qualities, resolutions or bitrates, so as to offer the terminals wishing to consult a version of this content suited to their rendering capability. The preparation of the content also includes a step of segmentation of the different representations into sections, called "media segments" or "chunks" that may represent a few seconds of broadcast. In the rest of this disclosure, "representation" will refer to a particular version of the same content. For example, the content C1 in FIG. 1 has two segmented representations R1 and R2 (106, 107). The borders of the segments are superimposable, so that a terminal may pass from one representation to the other at the end of each segment in a way that is transparent for the user.

The server places at the disposal of the terminals a description of the available contents including in particular the characteristics of the different representations available for a given content. This description is, for example, termed an "MPD" (Media Presentation Description), "Playlist" or "manifest" according to the standard used. In the rest of this disclosure, "manifest" will refer to such a description. A manifest 121 may be transmitted in the form of a carrier signal of descriptive information. This manifest is, for example, downloaded by the rendering device 100 when it wishes to access the content C1 and may include an item of descriptive information 120 for the content C1 including the description (112, 113) of the different representations available. For example, the description of the representation R1 of the content C1 may include at least one URL (Universal Resource Identifier) 114 for accessing the segments composing the representation and an item of information 115 relating to the quality of the representation. Likewise, the description of the representation R2 of the content C1 may include at least one URL (Universal Resource Identifier) 117 for accessing the segments composing the representation and an item of information 118 relating to the quality of the representation. Thus, from the manifest 121, the rendering system 100 may access the representation of the content C1 most suited to its characteristics and begin the rendering.

It should be noted that the manifest describes the different representations of a content at a given instant and that the availability of a particular representation may evolve over time. In other words, a representation described in a manifest at a given instant may no longer be available at a following instant when the rendering has begun, which generally causes a playback error on the rendering system. For example, a server may decide to suspend the distribution of a high quality representation when its load exceeds a critical threshold. In other scenarios, some segments of a content may only be available in some representations. For example, in FIG. 1, the segments 108 and 109 of the representation R1 correspond to an advertising spot inserted into the content C1. Since the spot is not available in high resolution, the corresponding segments 110 and 111 in the representation R2 (107) are missing, which causes the rendering to terminate when the rendering system attempts to access them.

The invention provides for associating with at least one representation an item of information regarding guarantee of availability of this representation. For example, the description of the representation R1 present in the manifest 121 includes an item of information regarding availability over time 116 making it possible to indicate to the terminal that the availability of all the segments of the representation is guaranteed. More generally, the information regarding guarantee of availability consists, for example, of a type of availability and an associated value, the associated value being, for example, a value included in a set of predefined values, a probability, a Boolean, a character string, or any other value capable of providing an item of information regarding availability.

According to one particular embodiment, the information regarding guarantee of availability may be accompanied by an item of temporal information representative of a period during which the information regarding guarantee of availability is valid.

According to one embodiment, the information regarding guarantee of availability relates primarily to the availability over time of all the segments of a given representation. For example, the information regarding availability 119 in FIG. 1 makes it possible to indicate to the rendering system 100 that the availability of the segments of the representation R2 is optional, i.e. that at least one portion of the segments composing it is likely to be no longer accessible. Likewise, the information regarding guarantee of availability 116 in FIG. 1 makes it possible to indicate to the rendering system 100 that the availability of the segments of the representation R1 is guaranteed. In a manifest file, the information regarding availability may, for example, be expressed by:

<availability:always> for a representation the availability of which is guaranteed,
<availability:optional> for a representation the broadcasting of which may be suspended.

According to another embodiment, the information regarding guarantee of availability may also correspond to a latency when accessing a particular representation. Its value then reflects the fact that a representation is systematically cached so as to reduce the access time to the segments and thus to improve the convenience of playback. The information may, for example, take a value such as:

<cacheability:always> for a systematically cached representation,
<cacheability:optional> for a representation that may not be cached.

According to another embodiment, the information regarding availability may further relate to the availability of a representation from a particular access. For example, a high definition representation of a video content may not be accessible from a 3G mobile access or be accessible only from a residential access. The information regarding availability may then be expressed in the following way in the manifest:

<reachability:always> for a representation reachable from any access point, or
<reachability:optional> for a representation that may be inaccessible from some access points.

It should be noted that the person skilled in the art is well aware of other means of expressing a type/value association in a document such as a manifest and that the examples above are given only as a guide for the sole purpose of illustrating this disclosure. On the other hand, these various embodiments may be combined, since the various items of guarantee information may cohabit in the same descriptive medium.

Figure 2:
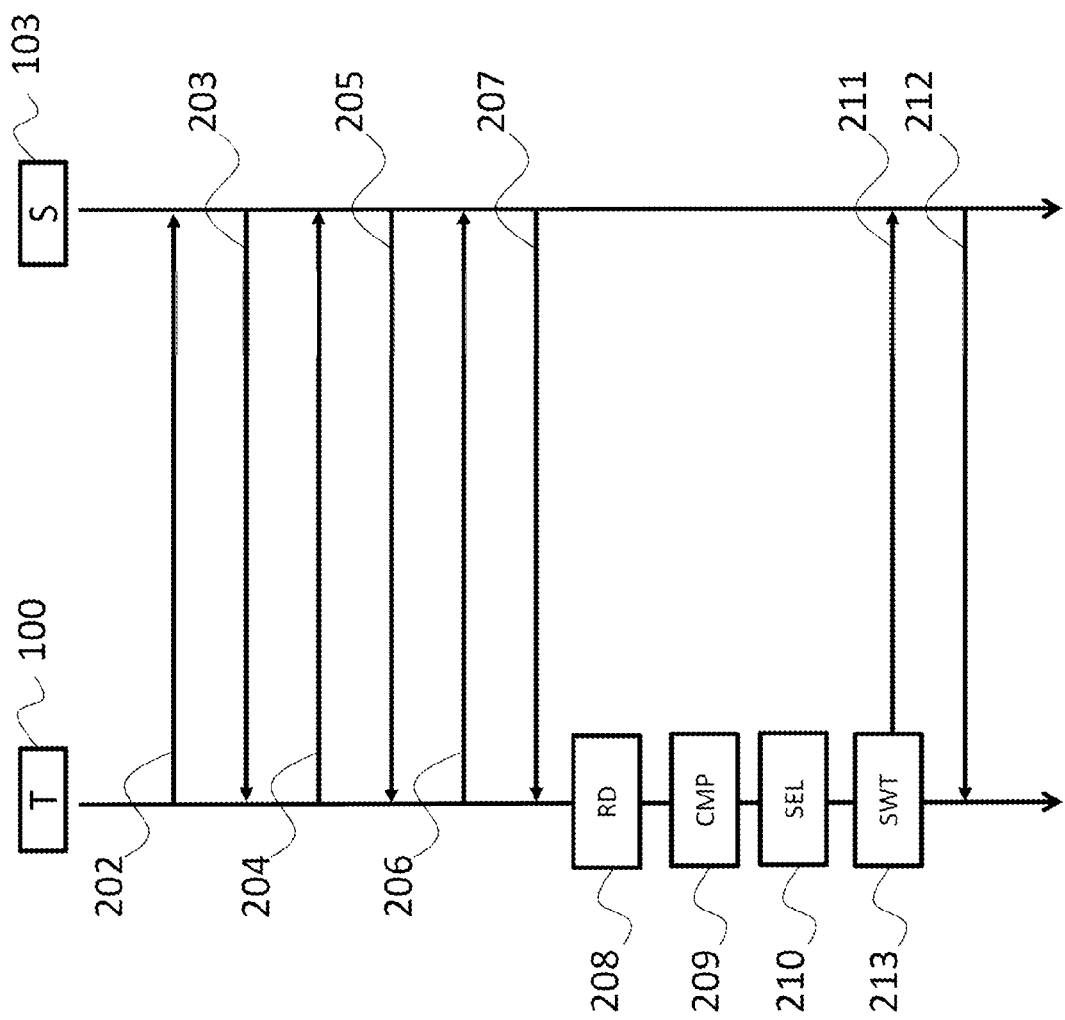
FIG. 2 represents in a timing diagram the messages that may be exchanged between a server and a terminal implementing the error processing method according to a particular embodiment of the invention.

FIG. 2 is a timing diagram that represents, in a simplified way, messages exchanged during the consultation from the rendering system 100 of a content broadcast by the server 103 in one exemplary embodiment of the invention. In particular, the figure depicts messages that may be exchanged when an error occurs as a result of the sudden unavailability of the representation in the process of rendering. In the rest of this disclosure, the messages will be considered as being exchanged according to the HTTP protocol, but other implementations may be based on other data exchange protocols.

In this example, the rendering system 100 first downloads a manifest from the server 103, by transmitting, for example, a GET request 202 to the server. In the context of this invention, the location of the manifest is of no importance, it may, for example, be downloaded from a separate server to the server 108. In response 203 to this request, the server 103 transmits the manifest 121 to the rendering system which optionally stores it in a memory. From the manifest 121, the rendering system chooses according to certain criteria to render the representation R2 107. The rendering system selects, for example, a high quality representation of the content C1 because the consultation is performed from a domestic environment with a high bitrate Internet access and compatible hardware. The rendering system begins the rendering by transmitting a GET request 204 to download the first two segments R2.1 and R2.2 of the representation R2 of the content C1, in response 205 to which it may receive the segments to be rendered. The rendering system 100 then transmits a new request 206 in order to obtain the next two segments 110 and 111. The requested segments may have been described in the manifest but no longer be available at the time of the request, e.g. for reasons previously cited. In this case, the server indicates the unavailability of the requested segments by an error 207.

According to the invention, the rendering system obtains from the manifest during a step 208, an item of information regarding guarantee of availability as described above associated with at least one representation of the content. For example, the rendering system may consult the manifest 121 and extract from it the availability values 116 and 119 corresponding to the representations of the content C1.

In step 209, the method according to the invention provides for performing a comparison with a predefined availability value. For example, the rendering system may compare the availability values 116 and 119 of the representations R1 and R2 (112, 113) with the value "ALW" indicating in this example a guaranteed availability. Still in this example, the rendering system may determine that the representation R1 has a guaranteed availability.

The rendering system may then select during a step 210 a representation the availability of which is guaranteed that will advantageously make it possible to continue the consultation of the content without risk of a new incident. In this example, the rendering system selects the representation R1 and transmits, during a step 213 a request 211 to download in response 212 the segments R1.3 and R1.4 (108, 109) and switch to the rendering of the representation R1.

According to one particular embodiment, the rendering system may also extract an item of temporal information associated with the item of availability data. This may be, for example, a period during which the availability of a representation can be guaranteed. This advantageously makes it possible to respond to the problem of inserting some advertising spots available only according to one representation as mentioned earlier, since the rendering system is thus capable of reselecting the deficient representation after the passage of a certain duration measured, for example, using a clock.

Figure 3:
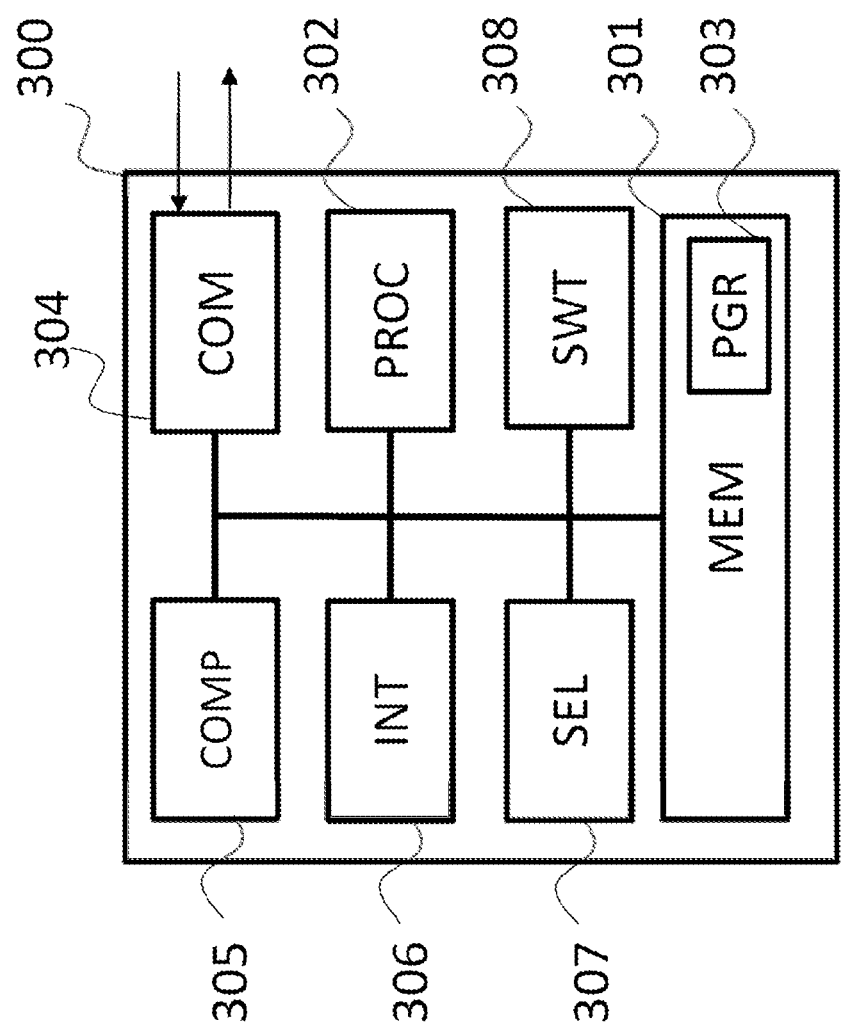
FIG. 3 illustrates the architecture of a device suitable for the implementation of the error processing method according to a particular embodiment.

FIG. 3 represents the simplified architecture of a device 300 that is capable of implementing the error processing method as described above, according to a particular embodiment. The device includes a storage space 301, e.g. a memory MEM and a processing unit 302 provided, for example, with a processor PROC. The processing unit may be controlled by a program 303, e.g. a computer program PGR, implementing the error processing method as described with reference to FIG. 2, and notably the steps of obtaining (208), from the descriptive information and for at least one representation indicated in the descriptive medium, at least one item of information regarding availability associated with the representation; of comparing (209) information regarding availability with a predetermined value; of selecting (210) a fallback representation the availability of which is guaranteed according to the result of the comparison; and of switching (213) to the selected representation.

On initialization, the instructions of the computer program 303 are, for example, loaded into a RAM (Random Access Memory in English) memory, before being executed by the processor of the processing unit 302. The processor of the processing unit 302 implements the steps of the error processing method, according to the instructions of the computer program 303. For this, the device includes, in addition to the memory 301, a communication unit 304 (COM) enabling the device to connect to a communication network and exchange data with other devices via this communication network. This communication unit may, for example, be a network interface and is used notably to obtain a carrier signal of descriptive information, to transmit requests and receive responses through the communication network. The device also includes a unit for interpreting 306 (INT) the content of a manifest and particularly for reading an item of information regarding availability, a unit for comparing 305 (COMP) an availability value with a predefined value, a unit for selecting 307 (SEL) a representation according to the result of the comparison and a unit for switching 308 (SWITCH) to the selected representation.

According to one particular embodiment, the device may be incorporated in a digital decoder terminal, Set Top Box, connected television, tablet, mobile phone, personal computer, or even any other rendering equipment connected to a communication network.

An exemplary embodiment of the present invention improves the situation described in the Background section.

Although the present disclosure has been described with reference to one or more examples, workers skilled in the art will recognize that changes may be made in form and detail without departing from the scope of the disclosure and/or the appended claims.

What is claimed is:

1. A method for processing an error in the course of rendering of a digital content during a multimedia session on a terminal, said session offering a plurality of representations of said digital content described in a descriptive information medium for the multimedia session transmitted independently of representation data of the plurality of representations, wherein the method is implemented by the terminal and comprises the following acts performed after obtaining the descriptive medium:
for at least one representation indicated in the descriptive information medium, obtaining from the descriptive information medium at least one item of information regarding guarantee of availability of the data of the representation on a server,
comparing the information regarding guarantee of availability of the data of the representation on the server with at least one predetermined value,
selecting a fallback representation according to a result of the comparison, and
on detection of a rendering error, transmitting a request for at least one segment of the selected fallback representation.

2. The method as claimed in claim 1, wherein the fallback representation is selected prior to the error detection.

3. The method as claimed in claim 1, wherein the fallback representation is selected after the error detection.

4. The method as claimed in claim 1, wherein the information regarding guarantee of availability includes an item of information representative of a type of guarantee belonging to the group consisting of:
guarantee of availability of the data of the representation on a server,
guarantee of speed of access to the representation,
guarantee of availability from any access points,
as well as an item of information of value associated with the type of guarantee.

5. The method as claimed in claim 4, wherein the information regarding guarantee of availability further includes an item of data representative of a temporal period of validity associated with the type of guarantee.

6. The method as claimed in claim 1, wherein the selection of the fallback representation is repeated at the expiration of the period of validity associated with the information regarding guarantee of availability of the selected fallback representation.

7. A device for processing an error in a course of rendering a digital content during a multimedia session, said session offering a plurality of representations of said digital content described in a descriptive information medium for the multimedia session transmitted independently of representation data of the plurality of representations, wherein the device comprises:
at least one processor; and
at least one non-transitory computer readable medium comprising instructions stored thereon which when executed by the at least one processor configure the device to:
obtain from the descriptive information medium, for at least one representation indicated in the descriptive information medium, at least one item of information regarding availability of the data of the representation on a server,
compare the information regarding availability of the data of the representation on a server with a predetermined value,
select a representation according to the result of the comparison, and
on detection of a rendering error, switch to transmit a request for at least one segment of the selected fallback representation.

8. A non-transitory computer-readable medium on which a computer program is recorded including instructions for execution of a method of processing an error in the course of rendering of a digital content during a multimedia session on a terminal, when the instructions are executed by a processor of the terminal, said session offering a plurality of representations of said digital content described in a descriptive information medium for the multimedia session transmitted independently of the representation data of the plurality of representations, wherein the method comprises the following acts performed after obtaining the descriptive medium:
for at least one representation indicated in the descriptive information medium, obtaining from the descriptive information medium at least one item of information regarding guarantee of availability of the data of the representation on a server, comparing the information regarding guarantee of availability of the data of the representation on the server with at least one predetermined value,
selecting a fallback representation according to a result of the comparison, and
on detection of a rendering error, transmitting a request for at least one segment of the selected fallback representation.

\* \* \* \* \*

UNITED STATES PATENT AND TRADEMARK OFFICE
CERTIFICATE OF CORRECTION

| | | |
|---|---|---|
| PATENT NO. | : 11,997,369 B2 | |
| APPLICATION NO. | : 18/304785 | |
| DATED | : May 28, 2024 | |
| INVENTOR(S) | : Sylvain Kervadec and Pierre Ruellou | |

It is certified that error appears in the above-identified patent and that said Letters Patent is hereby corrected as shown below:

On the Title Page

Insert --(30) Foreign Application Priority Data
Jan. 7, 2014 (FR) 1450083--

Signed and Sealed this
Ninth Day of July, 2024

Katherine Kelly Vidal
*Director of the United States Patent and Trademark Office*